United States Patent
Mackey

(10) Patent No.: US 6,335,046 B1
(45) Date of Patent: Jan. 1, 2002

(54) METHOD AND APPARATUS FOR MOLDING DOUGH

(75) Inventor: Harry Joseph Mackey, East Ridge, TN (US)

(73) Assignee: Sara Lee Bakery Group, Inc., St. Louis, MO (US)

( * ) Notice: Subject to any disclaimer, the term of this patent is extended or adjusted under 35 U.S.C. 154(b) by 0 days.

(21) Appl. No.: 09/364,210

(22) Filed: Jul. 29, 1999

(51) Int. Cl.[7] ............................................... A21C 11/00
(52) U.S. Cl. .................. 426/496; 425/332; 425/364 R; 426/512
(58) Field of Search ............................ 425/332, 364 R; 426/496, 512

(56) References Cited

U.S. PATENT DOCUMENTS

| | | |
|---|---|---|
| 756,600 A | 4/1904 | Dodge |
| 3,568,820 A | 3/1971 | Patch |
| 3,889,802 A | 6/1975 | Jonkers |
| 4,008,025 A * | 2/1977 | Campbell .................... 425/332 |
| 4,062,321 A | 12/1977 | Greenig |
| 4,306,850 A * | 12/1981 | Cummins .................... 425/332 |
| 4,779,718 A | 10/1988 | JOnkers |
| 5,110,610 A * | 5/1992 | Cummins .................... 425/332 |
| 5,687,641 A | 11/1997 | Williamson et al. |
| 5,865,299 A | 2/1999 | Williams |
| 6,123,537 A * | 9/2000 | Cummins et al. ........... 425/332 |

* cited by examiner

Primary Examiner—Nam Nguyen
Assistant Examiner—Joseph Leyson
(74) Attorney, Agent, or Firm—Harness, Dickey & Pierce, P.L.C.

(57) ABSTRACT

A method of forming pieces of dough into balls, the method includes the steps of moving the dough pieces on a moving belt past a shaper bar while urging the belt against the shaper bar with a plurality of fluid jets. An apparatus for forming pieces of dough into balls includes a moving belt having a top surface for conveying the pieces of dough thereon, and a bottom surface, a shaper bar extending over the top surface of the moving belt for shaping pieces of dough moved past the shaper bar on the moving belt; and a plurality of fluid jets for urging the belt against the shaper bar.

4 Claims, 4 Drawing Sheets

METHOD AND APPARATUS FOR MOLDING DOUGH

FIELD OF THE INVENTION

This invention relates to dough handling equipment, and in particular to a method and apparatus for forming dough into balls.

BACKGROUND OF THE INVENTION

In the manufacture of dough, it is sometimes desirable to form the dough into balls for further processing or packaging. One way of forming dough into balls is to drop pieces of dough onto a moving conveyor belt, which moves the dough pieces past a shaper bar that forms the dough pieces into balls. To properly form the dough pieces, the shaper bar must impinge upon the moving belt. The impingement of the bottom of the shaper bar on the top surface of the belt pushes the bottom surface of the belt against the supporting bed. The friction between the bottom of the shaper bar and the top of the belt and between the bottom of the belt and the supporting bed generates heat, which warms the dough above the proper handling temperature, making it more difficult to work.

SUMMARY OF THE INVENTION

Generally the method and apparatus of the present invention form dough pieces into balls without excessively heating the dough. More particularly, according to the method and apparatus of the present invention, a moving belt and shaper bar are held together sufficiently to properly shape dough pieces into balls without generating enough heat to warm the dough above its proper working temperature.

Generally the method of this invention comprises moving pieces of dough on a belt past a shaper bar while urging the belt against the shaper bar with a plurality of fluid jets. The fluid jets both urge the belt against the shaper bar so that the dough pieces on the belt are properly formed and shaped, and help cool the belt to prevent heating of the belt and the dough on the belt. In the preferred embodiment the fluid jets are a series of air jets aligned with the bottom of the shaper bar.

Generally the apparatus of this invention comprises a moving belt having a top surface for carrying pieces of dough thereon, and a bottom surface, and a shaper bar disposed over the top surface of the belt for forming dough pieces carried on the belt past the shaper bar into balls. A plurality of fluid jets impinge on the bottom of the belt, urging the belt against the shaper bar so that the dough pieces on the belt are properly formed and shaped. In the preferred embodiment the fluid jets are air jets aligned with the bottom of the shaper bar.

The method and apparatus of the present invention allow pieces of dough to be quickly and easily formed into balls, without undue heating of the dough beyond its appropriate working temperature. The method and apparatus allow for adjustment of the pressure between the belt and the shaper bar to minimize wear while still providing adequate force to properly shape the dough. These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE INVENTION

Figure 1:
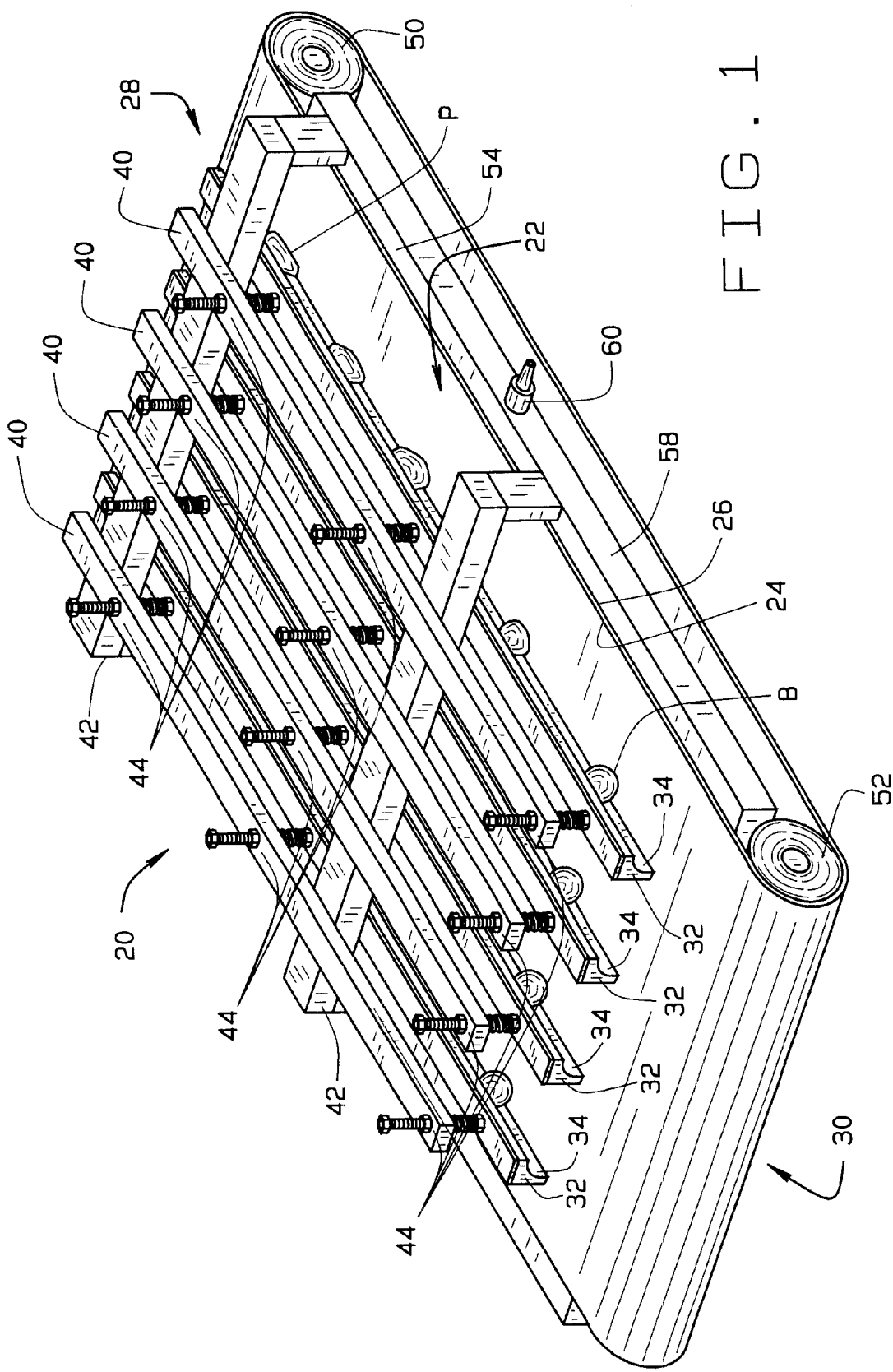
FIG. 1 is a perspective view of a dough forming apparatus constructed according to the principles of this invention.

A dough forming apparatus constructed according to the principles of this invention is indicated generally as 20 in FIG. 1. The apparatus 20 is adapted for forming pieces of dough into balls. The apparatus 20 comprises a moving belt 22 having a top surface 24 for conveying the pieces P of dough thereon, and a bottom surface 26. The belt 22 has an inlet end 28 on which pieces P of dough are dropped onto the top surface 24 of the moving belt. The belt 22 also has an outlet end 30, opposite the inlet end, for delivering shaped balls B of dough for further processing or use.

Figure 3:
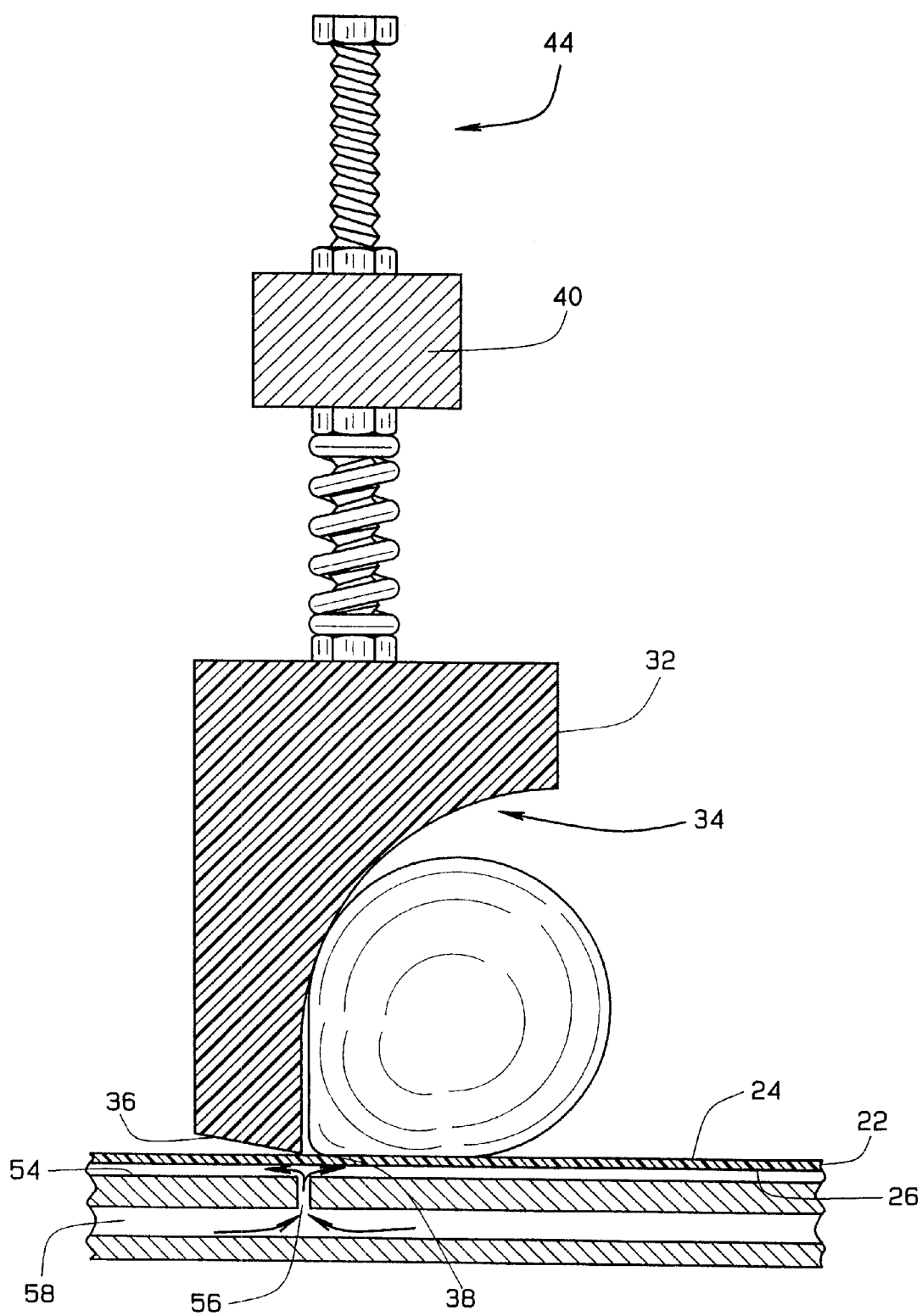
FIG. 3 is a partial vertical cross-sectional view of the dough forming apparatus taken along the plane of line 3—3 in FIG. 1.

A shaper bar 32 extends over the top surface 24 of the moving belt 22 for shaping pieces P of dough moving past the shaper bar on the moving belt. The shaper bar 32 is preferably made of nylon and has a compound shaping surface 34 facing downwardly and outwardly which gradually forms pieces of dough into balls. The shaper bar 32 extends generally parallel to the direction of movement of the belt 22, but is oriented at a slight angle with respect to the direction of movement of the belt, with the shaping surface facing slightly upstream, so that the movement of the belt pushes the dough pieces along and against the shaping surface 34. As best shown in FIG. 3, the shaper bar 32 has a sloped or beveled bottom 36, slowing upwardly and outwardly away from the bottom of the shaping surface, so that the primary contact between the shaper bar 32 and the belt 22 is along an edge 38, adjacent the shaping surface 34.

In the preferred embodiment, there are a plurality of shaper bars 32 suspended from generally longitudinally extending supports 40, which in turn are suspended from transverse supports 42. Each shaper bar 32 is supported by a plurality of resilient vertical supports 44 that can adjust the vertical position of the shaper bars relative to the supports 40.

Figure 2:
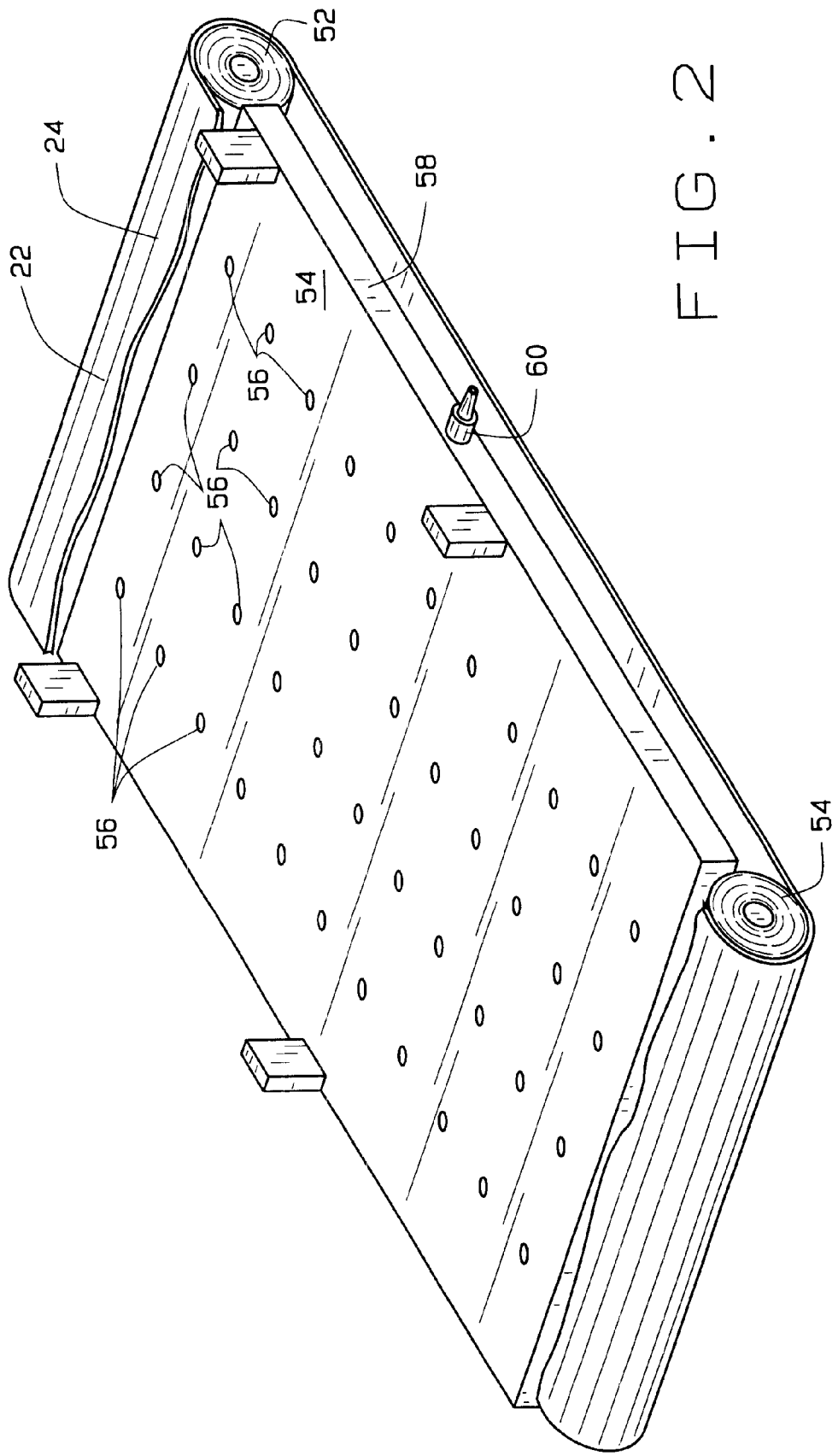
FIG. 2 is a perspective view of the dough forming apparatus, with portions broken away to show details of construction.

As best shown in FIGS. 1 and 2, the moving belt 22 includes rollers 50 and 52 and a bed 54 therebetween for supporting the belt between the rollers. In accordance with this invention, there are a plurality of fluid jets directed upwardly against the bottom surface 26 of the belt 22, for urging the belt against the bottom 36 and particularly the bottom edge 38 of the shaper bar 32. These fluid jets are preferably air jets, and are preferably aligned with the edge 38 of the shaper bar 32. The jets both force the belt 22 against the bottom edge of the shaper bar 32, and they also help cool the belt from the heat generated by the friction between the belt and the bottom of the shaper bar.

In the preferred embodiment, there are openings 56 in the bed 54 through which fluid—preferably air—is ejected under pressure to form the jets. As shown in FIG. 2, the bed 54 is preferably the top surface of a plenum 58, which has a connector 60 for connecting the plenum to a source of fluid under pressure, such as a source of compressed air. As shown in FIG. 1, in the preferred embodiment there are preferably a plurality of generally parallel shaper bars 32 over the top surface 24 of the belt 22, for simultaneously forming several pieces of dough into balls. Thus, as shown in FIG. 2, the openings 56 in the bed 54 are arranged in lines that are at an angle to the direction of the movement of the belt, so that the openings are aligned with the bottom edge 38 of their respective shaper bars 32, which are themselves at an angle with respect to the direction of travel of the belt 22.

According to the method of the present invention for forming pieces of dough into balls, the method comprises the steps of moving the dough pieces P on a moving belt 22 past a shaper bar 32 while urging the belt against the bottom 36 of shaper bar with a plurality of fluid jets. These fluid jets are preferably air jets, and are preferably aligned with the bottom edge 38 of the shaper bar 32 so that the belt 22 in the vicinity of the bottom of the shaper bar is urged against the shaper bar, to facilitate the formation of balls from the dough pieces P and to cool the belt to prevent excessive heating of the dough. As shown in FIG. 3, a fluid jet such as air jets formed by air escaping from openings 56 in the bed 54 on the top of the plenum 58. The jets are aligned with the bottom of the shaper bar 32, to urge the belt against the bottom 36 of the shaper bar. In addition to urging the belt 22 against the shaper bar, the jets also cool the belt, reducing the heating of the belt and the shaper bar, and consequently reducing the heating of the dough.

Figure 4:
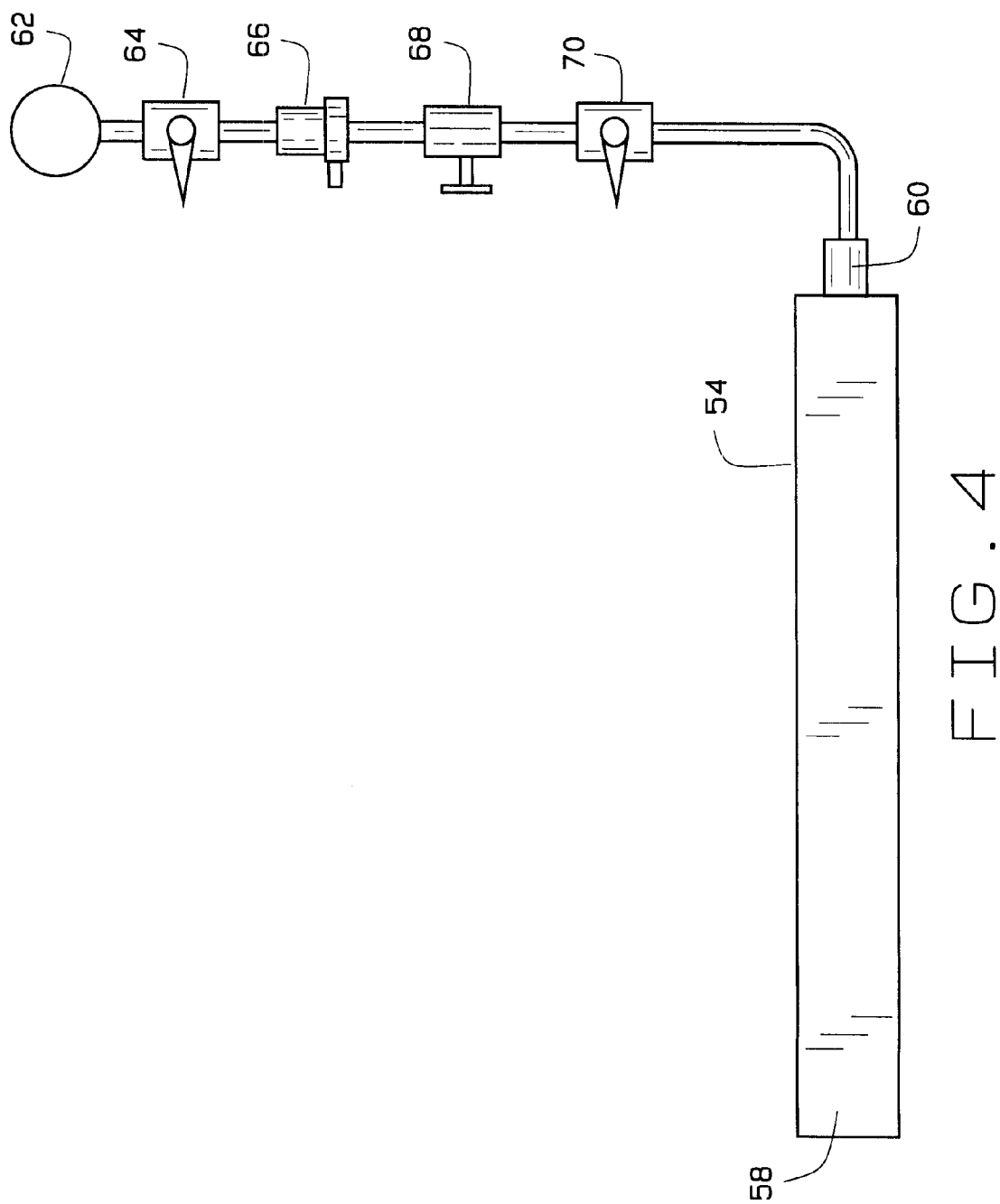
FIG. 4 is a schematic of the fluid jet system employed in the dough forming apparatus.

As shown in FIG. 4, fluid under pressure, and in the preferred embodiment air under pressure, is provide to the plenum 58 through connector 60. An air supply 62 is connected to the connector 60 via ball valve 64, solenoid valve 66, regulator 68, and ball valve 70. The ball valves 64 and 70 can be used to manually control the flow of air to the plenum 58. The solenoid valve 66 automatically controls the flow of air to the plenum, allowing air to flow only when the apparatus 20 is operating. The regulator 68 can be operated to control the pressure of the air flow to the plenum 58.

What is claimed is:

1. An apparatus for forming pieces of dough into balls, the apparatus comprising a moving belt having a top surface for conveying the pieces of dough thereon, and a bottom surface, a bed over which the belt passes, a shaper bar extending over the top surface of the moving belt for shaping pieces of dough moved past the shaper bar on the moving belt; a plurality of openings in the bed through which fluid is ejected forming fluid jets for urging the belt against the shaper bar, the shaper bar extending at an angle with respect to the direction of movement of the belt, and the openings in the bed being aligned only with the shaper bar.

2. An improved apparatus for forming pieces of dough into balls, the apparatus comprising a moving belt having a top surface for conveying the pieces of dough past, a bed over which the belt passes, and a shaper bar extending over the top surface of the belt, the improvement comprising a plurality of openings in the bed through which fluid is ejected forming fluid jets for urging the belt against the shaper bar, the shaper bar extending at an angle with respect to the direction of movement of the belt, and the openings in the bed being aligned only with the shaper bar.

3. A method of forming pieces of dough into balls, the method comprising the steps of moving the dough pieces on a moving belt past a shaper bar while urging the belt against the shaper bar with a plurality of fluid jets, the belt moving over a flat bed having a plurality of openings therein forming the fluid jets the shaper bar extending at an angle with respect to the direction of movement of the belt, and the openings in the bed being aligned only with the shaper bar, and the step of urging the belt against the shaper bar with a plurality of fluid jets includes injecting fluid through the openings in the bed.

4. An improved method of forming pieces of dough into balls, the method in which pieces of dough are moved on a moving belt past a shaper bar extending over the surface of the belt, the improvement comprising urging the belt against the shaper bar with a plurality of jets, the belt moving over a bed having a plurality of openings therein forming the fluid jets, the shaper bar extending at an angle with respect to the direction of movement of the belt, and the openings in the bed being aligned only with the shaper bar, and the step of urging the belt against the shaper bar with a plurality of fluid jets includes injecting fluid through the openings in the bed.

* * * * *